Patented Aug. 11, 1925.

1,548,872

UNITED STATES PATENT OFFICE.

CARLETON ELLIS, OF MONTCLAIR, NEW JERSEY.

PRODUCTION OF MATERIAL FOR CATALYSTS.

No Drawing. Application filed April 7, 1921. Serial No. 459,274.

*To all whom it may concern:*

Be it known that I, CARLETON ELLIS, a citizen of the United States, residing at Montclair, in the county of Essex and State of New Jersey, have invented certain new and useful Improvements in the Production of Material for Catalysts, of which the following is a specification.

The present invention relates to the treatment of precipitated nickel compounds which are to be employed in the production of catalyzers suitable for hydrogenation of oils, and has special reference to a method of drying (that is, removing the water from) the precipitate, such precipitate containing nickel compounds, and also, preferably associated therewith, copper compounds. The method, however, is applicable also to wet precipitates generally containing or consisting of compounds of metals which in the reduced condition (i. e., metal or suboxid or the like) possess the desired catalyzer properties. Heretofore in the production of catalyzers from salts of nickel, one of the customary procedures has been to precipitate nickel carbonate or nickel hydroxid or the corresponding compounds of other metals of like character, to filter the precipitate from the mother liquor, to dry the precipitate (either with or without washing to remove soluble salts therefrom) and to then subject the precipitate to reducing operations for producing the free metal or the suboxid of the metal. In the latter step it has been heretofore proposed to suspend the dried precipitate in an oil vehicle into which reducing gases are led while the mixture is at a high temperature, or to otherwise reduce the precipitate in the oil, at a high temperature. One property of the catalyst which is of substantial importance as affecting the activity and the longevity of the catalyst is its state of division and the property of the catalyst of remaining in suspension in the oil under treatment for a desired length of time. This property is considerably affected by the density of the precipitated nickel compound, at the time when the reduction operation is commenced. For many purposes it is advisable to produce catalyzers for hydrogenation which can be readily maintained in suspension in the oil under treatment for a protracted period, and it is advisable also to have the catalyst in such a physical condition, as regards density, flocculence, character of division and porosity, that it may be maintained in suspension to the desired extent, solely by hydrogen introduced below the surface of the oil; that is to say, without mechanical agitation. Accordingly an important feature of the present invention resides in producing the dried precipitate in such a state of subdivision, porosity, density and flocculence that upon subsequent reduction the necessary or desired physical conditions of the catalyzer will exist. It may be called to attention that when precipitated nickel carbonate hydroxide, basic carbonate or other precipitates of a basic character are completely dried in the open air, considerable densification of the particles of the precipitate is produced. An object of the present invention is to dry the precipitates referred to without producing such densification, and this result is readily secured by drying in an oil vehicle, as more fully described below. The drying step may be generically described as incorporating a wet precipitate with an oil vehicle, of the proper physical and chemical character and heating the precipitate while carried in such oil vehicle, sufficiently to drive off the water carried by said precipitate, including visible water (the water which makes the precipitate appear wet), hygroscopic water (water carried by the precipitate without producing visible wetness) and water of constitution of hydroxides or hydrated carbonates, basic carbonates and other basic salts.

For purposes of more completely illustrating the nature of the invention, the following examples are given, but it is understood that the invention is not restricted to the specific examples.

*Example 1.*—A solution of a nickel salt such as nitrate or sulphate is treated with an equivalent amount, or an excess, of a caustic alkali such as quick lime or hydrated lime to form a precipitate containing nickel hydroxide or preferably a precipitate containing both nickel hydroxide and basic compounds of nickel and calcium. The precipitate in wet condition, either with or without washing, may be added to oil, for example, melted paraffin wax substantially free from sulfur compounds and heated sufficiently to drive off the water of constitution of the nickel hydroxide.

*Example 2.*—Approximately chemically equivalent portions of nickel sulphate and sodium carbonate are placed in a solution separately and the solutions mixed. The reaction product may be filtered and washed if desired or may be directly evaporated to dryness or to a paste and then can be ground to a fine powder if in a lumpy condition. The resulting material is then placed in cottonseed oil, preferably hydrogenated cottonseed oil of a melting point of about 60° C., and the mixture heated preferably to over 200° C. In this operation a temperature of between 240° and 270° C. is particularly useful. Hydrogen gas or other reducing gas such as carbon monoxid or mixtures of or containing hydrogen and carbon monoxid or either of these, may be passed into the oil which is preferably agitated continuously and the reduction is allowed to proceed until enough metallic nickel or other form of nickel catalyzer material is present to bring about oil hardening in a rapid manner. The mass is then filtered and the catalyzer concentrate is collected. This latter is added to a fresh quantity of oil which is thereupon hardened by treatment with hydrogen. In this example, in place of oil as the vehicle and the use of a separate reducing agent such as hydrogen, wax such as paraffin wax, or glycerine, or other body which upon heating to an appropriate temperature evolves hydrogen or a reducing gas or vapor, or which upon heating acts as a reducing agent, may be employed. Mineral oil as well as paraffin wax, or other petroleum products should, of course, be previously tested to show the absence of sulfur compounds therein, before use.

*Example 3.*—Nickel sulphate and sodium carbonate or bicarbonate may be mixed in the dry state as powders or mixed and ground together and then moistened with water to bring about the reaction. The reaction product, either with or without washing, may be placed in oil and heated, moisture being thereby expelled as foam. The temperature may be run up to 250° C. or thereabouts while a current of hydrogen is passed through the mass, preferably kept under agitation.

*Example 4.*—Nickel nitrate containing some copper nitrate or a mixture of nickel and copper sulfates in solution, is precipitated with sodium carbonate or bicarbonate, and the precipitate washed if desired. The precipitate is collected in a filter press and thrown into an oil in a large kettle equipped with a stirring device, such as a soap crutcher. The mixture is then heated up to about 180° C. and hydrogen is passed in at the bottom. The reaction produces considerable heat, the temperature going up in some cases to 240° or even to 250° C. unless there is considerable cooling, by radiation and the like, and the copper and nickel compounds are reduced to the metallic state. In this case the copper carbonate is first reduced at the low temperature, and this acts as a starter for hydrogenation and also seems to catalytically induce the reduction of the nickel compounds, since nickel carbonate itself is not reduced to any substantial extent at 180° C. under usual conditions.

The mixture left after the water of the precipitate has been driven off is a creamy mass containing finely divided nickel compounds (and some copper compounds) which can be held in suspension without agitation for a considerable period.

*Example 5.*—Nickel sulphate solution is precipitated by sodium carbonate, potassium phosphate or the like either in hot or cold condition. The solution is put through a filter press and the cakes of nickel carbonate, either with or without washing, may be placed directly in completely hardened cotton-seed (or corn) oil and heated therein, either with or without the addition of hydrogen gas or other reducing agent, to produce the catalytic material.

The use of hydrogenated oils of this character possess certain advantages over the use of petroleum oils or petroleum waxes, petrolatum and the like. The present invention embraces the use particularly of a non-polymerizing fatty oil such as completely saturated, or substantially completely saturated hydrogenated fatty oil, or stearine oils of high melting point produced by other methods can also be employed.

*Example 6.*—Precipitated nickel hydroxide was placed in paraffin wax and heated until the mixture had the appearance of boiling. This heating was carried out in a deep vessel provided with a cover fitting substantially air tight so that the air had practically no access to the vapors of boiling wax which filled the space above the liquid. Considerable foaming was observed in the first part of the operation after which the wax was brought gently to the boiling point. In twenty minutes or so the wax became black in color and, upon examination thereof, shortly after this time, the material was found to be a mixture of paraffin wax and fine particles of nickel. No hydrogen or reducing gas was introduced into the receptacle during this operation. The reduction took place spontaneously in the presence of boiling paraffin. The precipitated nickel hydroxide containing sodium sulphate left as a reaction product therein can conveniently be employed in this process if desired.

*Example 7.*—Thirteen parts by weight of nickel sulphate (containing $6H_2O$) and 8.4 parts of sodium bicarbonate were ground up together and 6 parts of water added. The resulting porous, pasty mass upon further standing solidifies to a solid porous mass. This latter was placed in oil without previously washing, and after raising the temperature a reducing gas such as hydrogen can be introduced.

*Example 8.*—A preferred mode of carrying out the process is as follows: A tank containing a bulk of oil filling the tank up to within three or four feet of the top, is first heated to a temperature considerably above the boiling point of water, this being, for example, from 150° to 200° C., or even up to 250° or 260° C., whereby the viscosity of the oil is very greatly reduced. A wet precipitate of, say nickel hydroxid, is then thrown in small amounts, say a handful or so at a time, into the oil in the kettle. If this is done by hand, the operator may be stationed above the tank and may simply throw, with his hand, small quantities of the hydroxid at a time into the oil, this being thrown in different places on the surface of the body of the oil. During this operation it is preferable to maintain the temperature of the oil at the point above indicated. The oil during this operation is preferably well agitated or stirred, for example, by means of a rotary stirring paddle. The paddles aid in breaking up the foam produced and also aid in breaking up any lumps of the nickel hydroxid (or mixed nickel hydroxid and copper hydroxid) in order to give a non-lumpy and voluminous product. The oil used may be a fatty oil or mineral oil. The projection of the wet particles into the oil as above indicated, the oil being at much above the steam-forming temperature, gives rise to the development of superheated steam within the particles of material, this aiding greatly in breaking up the particles to give a more voluminous product. Hydrogen can then be blown into the mixture to reduce the nickel compounds to metallic nickel (or to reduce the nickel and copper compounds to mixed nickel and copper), and the catalyzer can then be filtered off or otherwise concentrated into a small portion of the oil. In case the oil under treatment is a heavy mineral oil or petrolatum or paraffin wax or the like, a preferred procedure is, after all of the nickel precipitate has been introduced, to still further heat the mixture, for example up to 340° to 370° C., to reduce to the metallic condition or suboxid condition, without the introduction of extraneous reducing gases.

The process of this last mentioned example is in many respects preferable as producing the desired results quickly.

The process is not only applicable in the case of nickel precipitates, but also in the case of precipitates of various other metals, and I call particular attention to the use of the process in connection with the production of catalyzer materials embracing such metals as nickel, cobalt and copper, or mixtures of two or more of these. Such metals and mixtures are embraced within the expression "a metal having an atomic weight between 58.6 and 63.6". The process is applicable whether the said catalyzer is to be reduced to the elemental condition or whether the same is to be used in the state of a suboxid.

The physical condition of the dehydrated material and of the reduction product is extremely suitable for catalytic purposes. The physical condition of the oxid affects the physical condition of the metal reduced therefrom.

When the wet precipitate is heated in oil, there is not the same opportunity for contraction that is presented when the precipitate is allowed to dry before being introduced into the oil. Furthermore, the evolution of steam during the period during which the precipitate is heated up with the oil, tends to hold the particles in a distended condition, thereby producing finely divided, porous, spongy nickel compounds which, when reduced, give finely divided, porous, spongy catalytic bodies.

The reduction can be effected by means of hydrogen or other reducing gases such as carbon monoxid or mixtures of the latter with hydrogen, also by the use of reducing vapors such as alcohol and the like. In some cases, notably with mineral oils free from sulfur, and addition of extraneous reducing agents is unnecessary, a higher temperature being here preferred.

There are certain advantages in the use of hardened oil or mineral oil free from sulfur, which do not appear when working with an unsaturated fatty oil. Any of the latter oils fume strongly when heated and deposit carbon or other substances due to the decomposition of the oil and such substances act unfavorably on the catalyzer. Unsaturated oils such as fish oil, cottonseed oil and the like when heated tend to polymerize, producing products which are thick and viscid and which are not readily filtered, whereas hydrogenated oil is not so affected, and is a substantially non-polymerizing material. This is particularly true of the fully hydrogenated oil such as hydrogenated cottonseed oil or hydrogenated corn oil having a melting point of 60° C. or higher.

The present application is in part a continuation of matter described in my copending application 236,669, filed May 27, 1918, now Patent No. 1,482,740, February 5, 1924. The continued matter embraces particularly the drying of precipitates containing nickel compounds, by heating the same in an oil vehicle, especially the oils herein above referred to, whereby the water of the precipitate is removed without producing densification of the precipitate.

The process of the present case (as with the disclosure thereof in the prior case) is especially applicable to the treatment of carbonate, hydroxid and other basic compounds of nickel, (i. e. those capable of neutralizing acids), and the term "basic compounds" as herein used is intended to include the hydroxid, carbonate and basic carbonate.

I claim:

1. A process of treating undried precipitates of compounds of those metals which have catalyzer properties, and which have atomic weights between 58.6 and 63.6, which comprises adding the precipitate, containing water, to a sufficient bulk of oil to produce a suspension of the precipitate in oil, and heating sufficiently to drive off a substantial part at least, of the water content of the precipitate.

2. A process of treating precipitates of compounds of those metals which have catalyzer properties which comprises incorporating the wet precipitate in an undried and undensified condition, with a sufficient amount of a non-polymerizing oil to produce a suspension of the precipitate in oil, and heating sufficiently to drive off a substantial part at least, of the water content of the precipitate.

3. A process of treating a precipitated nickel compound in an undried state, which comprises adding the undried precipitate to a sufficient bulk of oil to produce a suspension of the precipitate in oil, and heating sufficiently to drive off a substantial part at least, of the water content of the precipitate.

4. A process which comprises precipitating a nickel compound in the wet way, adding the wet precipitate to a bulk of heated oil and heating further to eliminate water from the precipitate.

5. A process of making a composite catalyst which comprises adding a mixture containing a reducible basic copper compound and a reducible basic nickel compound, to an oil, heating at any suitable stage of the operation to at least 150° C., by extraneous heating means, passing into the mixture, gases having a reducing action, whereby both the copper compound and the nickel compound are reduced, and catalyzer material in a finely divided condition, suspended in the oil, results.

6. A process which comprises adding to an oil, an undried wet precipitate containing nickel compounds which are capable of neutralizing acids, and heating to dry the precipitate.

7. A process which comprises adding to an oil, a wet precipitate containing nickel and copper compounds which are capable of neutralizing acids, and heating to dry the precipitate.

8. A process which comprises drying an undried precipitate containing a nickel compound, in an oil.

9. A process which comprises drying an undried precipitate containing a nickel compound of a basic character, in an oil.

10. A process which comprises drying a precipitate containing nickel and copper compounds of a basic character in an oil.

11. A process which comprises projecting a wet precipitate of a reducible compound of a metal having an atomic weight between 58.6 and 63.6, into a mass of hot liquid oleaginous material at a temperature considerably above 100° C.

12. A process which comprises adding nickel carbonate and a smaller amount of copper carbonate, to an oil, and passing a reducing gas into the mixture, and heating the mixture, at some stage of the operation, to a temperature not below 150° C., by extraneous heating means, whereby the carbonates are reduced.

13. A process which comprises adding nickel carbonate and a smaller amount of copper carbonate, both in an undried state, to an oil, and passing a reducing gas into the mixture, and heating said mixture at some stage of the operation, to a temperature not considerably below 150° C., by extraneous heating means, whereby the carbonates are reduced.

14. In the production of catalysts, the step of adding to hydrogenated oil, a mixture of basic compounds of a plurality of metals having atomic weights between 58.6 and 63.6, heating such oil to above 150° C., at any desired stage of the process, and introducing a gasiform reducing agent thereinto.

15. In the production of catalysts, the steps of adding to hydrogenated oil, a mixture of basic compounds of a metal having an atomic weight between 58.6 and 63.6 heating such oil to above 150° C., at any desired stage of the process, and introducing a gasiform reducing agent thereinto.

16. In the production of catalysts, the step of adding to hydrogenated oil, a mixture of basic compounds of a plurality of metals having atomic weights between 58.6 and 63.6, heating such oil to above 150° C., at any desired stage of the process.

17. A process of making a composite catalyst suitable for the hydrogenation of fatty oils, which comprises adding to an oil a mixed precipitate containing some copper carbonate and more nickel carbonate, such carbonates containing hydroscopic water, and introducing a reducing gas into the mixture of oil and carbonates to effect reduction of the carbonates, such mixture of oil and carbonates being at a temperature above 150° C., during a part at least of such last mentioned step.

18. As a product, a catalyzer comprising nickel and copper in reduced state and in undensified condition, sealed in hydrogenated fatty oil, the nickel being in considerable excess over the copper.

19. A process of making a composite catalyst suitable for the hydrogenation of fatty oils, which comprises adding to an oil a mixed precipitate containing copper carbonate and nickel carbonate in hydrated form and introducing a reducing gas into the mixture of oil and carbonates to effect reduction of the carbonates, such mixture of oil and carbonates being at a temperature above 150° C., during a part at least of such last mentioned step.

20. A process of making a composite catalyst which comprises adding a wet mixture containing a reducible basic copper compound and a reducible basic nickel compound, to an oil, heating at any suitable stage of the operation, to not substantially below 200° C., by extraneous heating means, passing into the mixture, gases having a reducing action, whereby both the copper compound and the nickel compound are reduced, and catalyzer material in a finely divided condition suspended in the oil, results.

In testimony whereof I affix my signature.

CARLETON ELLIS.